(12) United States Patent
Bemelmans

(10) Patent No.: US 8,363,393 B2
(45) Date of Patent: Jan. 29, 2013

(54) AUTO-CLOSABLE FLEXIBLE DISPLAY DEVICE

(75) Inventor: David J. E. Bemelmans, Eindhoven (NL)

(73) Assignee: Creator Technology B.V., Breda (NL)

( * ) Notice: Subject to any disclaimer, the term of this patent is extended or adjusted under 35 U.S.C. 154(b) by 847 days.

(21) Appl. No.: 12/306,183

(22) PCT Filed: Jun. 19, 2007

(86) PCT No.: PCT/NL2007/050294
§ 371 (c)(1),
(2), (4) Date: Apr. 13, 2009

(87) PCT Pub. No.: WO2007/148967
PCT Pub. Date: Dec. 27, 2007

(65) Prior Publication Data
US 2009/0237872 A1 Sep. 24, 2009

Related U.S. Application Data

(60) Provisional application No. 60/805,482, filed on Jun. 22, 2006.

(51) Int. Cl.
*H05K 7/14* (2006.01)
(52) U.S. Cl. ............... 361/679.21; 361/679.26; 248/917
(58) Field of Classification Search ............ 361/679.21, 361/679, 2, 679.01, 679.26, 679.27; 455/575.1–575.4; 345/156–158, 905; 292/251.5
See application file for complete search history.

(56) References Cited

U.S. PATENT DOCUMENTS

| | | | |
|---|---|---|---|
| 6,748,249 B1 * | 6/2004 | Eromaki et al. | 455/575.4 |
| 7,095,387 B2 * | 8/2006 | Lee et al. | 345/4 |
| 7,786,951 B2 * | 8/2010 | Huitema et al. | 345/1.2 |
| 2003/0144034 A1 * | 7/2003 | Hack et al. | 455/566 |
| 2006/0061555 A1 | 3/2006 | Mullen | |
| 2006/0229118 A1 * | 10/2006 | Kaneko | 455/575.3 |

FOREIGN PATENT DOCUMENTS

| | | |
|---|---|---|
| CN | 1472648 A | 2/2004 |
| WO | 2004/053818 A1 | 6/2004 |
| WO | 2006/038171 A1 | 3/2006 |

OTHER PUBLICATIONS

International Search Report PCT/NL2007/050294 dated May 14, 2008.

* cited by examiner

*Primary Examiner* — Jinhee Lee
*Assistant Examiner* — Ingrid Wright

(57) ABSTRACT

An auto-closable flexible display device including a flexible display (38); a spreader mechanism (50) operably connected to the flexible display (38), the spreader mechanism (50) having a latch assembly (36) to maintain the spreader mechanism (50) in an open position; an acceleration sensor generating an acceleration signal; and an acceleration processor responsive to the acceleration signal and generating a close signal when the acceleration signal exceeds a predetermined acceleration limit. The latch assembly (36) is responsive to the close signal to release the spreader mechanism (50) from the open position.

23 Claims, 6 Drawing Sheets

AUTO-CLOSABLE FLEXIBLE DISPLAY DEVICE

FIELD OF THE INVENTION

This invention relates generally to flexible display devices, and more specifically to flexible display devices providing an auto-closable flexible display.

BACKGROUND

Miniaturization and increased processing power has recently allowed great increases in the portability of electronics. Complex devices have been reduced to pocket size. Wherever they desire, consumers are able to carry and use such devices as cellular telephones, music players, game players, still and motion digital cameras, and GPS locators. Still, the size and form factor of the devices is often limited by the optical display because most devices currently use an inflexible glass optical display. Such displays are bulky, heavy, expensive, and fragile. Fragility increases with increasing display size, but limiting display size reduces the usefulness of the device. Content requiring high resolution, such as maps, cannot be shown on a small display.

To obtain greater portability and avoid the drawbacks of glass optical displays, flexible displays have been developed. Flexible displays are typically made of a flexible material that can be rolled about a cylinder or folded in a housing for storage in a closed position when not in use. To use the flexible display, the user pulls an exposed end of the flexible display with one hand while grasping the housing with the other hand. The flexible display switches to an open position to display the content desired. The flexible display devices often use a lightweight spreader mechanism to maintain the flexible display in the open position.

Although the flexible display and the spreader mechanism are enclosed within a housing and well protected when the flexible display device is in the closed position, the flexible display device is vulnerable to damage when in the open position. The flexible display can be torn or punctured and the spreader mechanism bent or twisted if the flexible display device is dropped to the floor while open. There have been attempts to make flexible display devices more rugged by adding shock absorbing materials and heavier components, but this makes the flexible display devices heavier and less portable.

SUMMARY OF THE INVENTION

It would be desirable to have a flexible display device that overcomes the above disadvantages.

One aspect of the present invention provides a flexible display device including a flexible display; a spreader mechanism operably connected to the flexible display, the spreader mechanism having a latch assembly to maintain the spreader mechanism in an open position; an acceleration sensor generating an acceleration signal; and an acceleration processor responsive to the acceleration signal and generating a close signal when the acceleration signal exceeds a predetermined acceleration limit. The latch assembly is responsive to the close signal to release the spreader mechanism from the open position.

Another aspect of the present invention provides a method for auto-closing a flexible display device having an open position and a closed position including measuring acceleration of the flexible display device; determining whether the acceleration exceeds a predetermined minimum acceleration limit; and releasing the flexible display device from the open position when the acceleration exceeds the predetermined minimum acceleration limit.

Another aspect of the present invention provides a flexible display device system including a flexible display device having means for spreading a flexible display, the spreading means having an open position and a closed position; means for measuring acceleration of the flexible display device; means for determining whether the acceleration exceeds a predetermined minimum acceleration limit; and means for releasing the spreading means from the open position when the acceleration exceeds the predetermined minimum acceleration limit.

BRIEF DESCRIPTION OF THE DRAWINGS

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
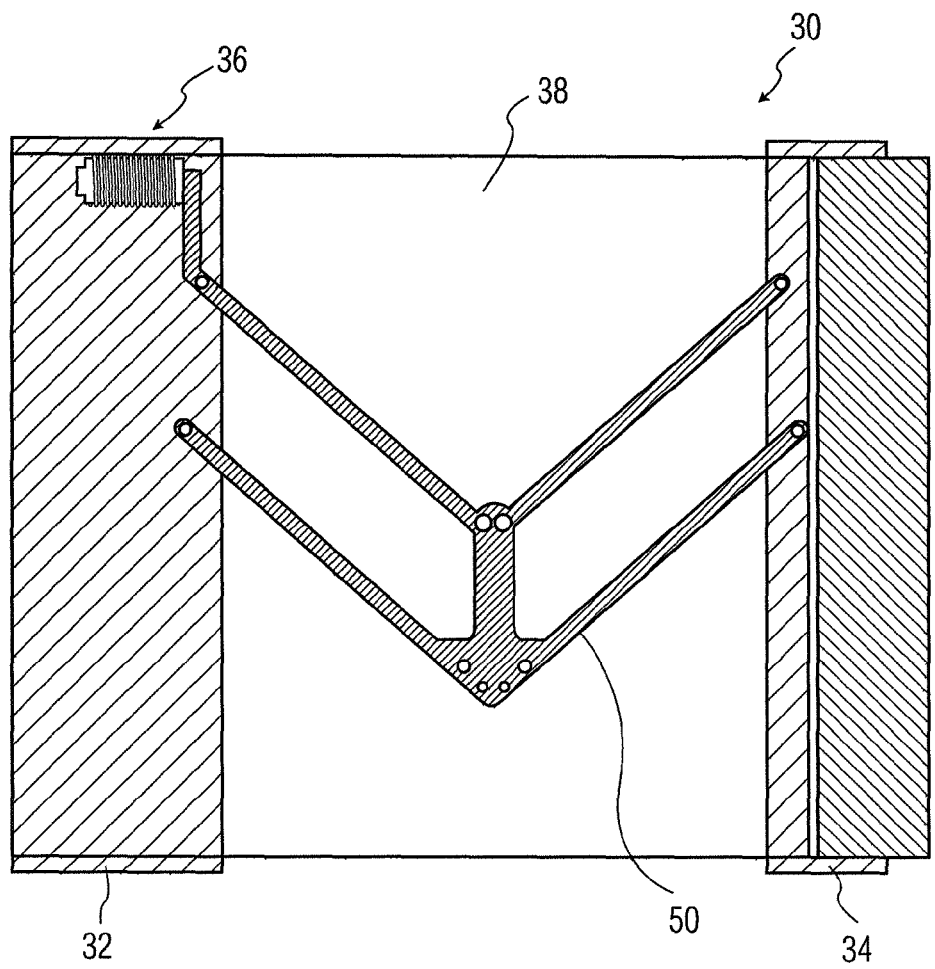
FIG. 1 is a front view in the extended configuration of a flexible display device made in accordance with the present invention.

FIG. 1 is a front view in the extended configuration of a flexible display device made in accordance with the present invention. In this example, the flexible display device uses a coil in the latch assembly to magnetically release the spreader mechanism from the open position when the flexible display device is dropped.

The flexible display device 30 includes a first frame 32, a second frame 34, a flexible display 38, and a spreader mechanism 50. The spreader mechanism 50 is operably connected to the flexible display 38 through the first frame 32 and second frame 34 to maintain the flexible display 38 in a planar configuration when the flexible display device 30 is in the open position as illustrated. The spreader mechanism 50 has a latch assembly 36 that maintains the spreader mechanism 50 in an open position. An acceleration sensor generates an acceleration signal for the flexible display device 30, such as an acceleration signal for the center of mass of the flexible display device 30. An acceleration processor responsive to the acceleration signal generates a close signal when the acceleration signal exceeds a minimum acceleration limit, such as a fraction of the gravitational acceleration of g or 9.8 m/sec$^2$. The latch assembly 36 is responsive to the close signal to release the spreader mechanism 50 from the open position. In one embodiment, the latch assembly 36 is passive, which is defined herein as not requiring energy input to maintain a given position. For example, the latch assembly 36 is passive in that it can maintain the spreader mechanism 50 in the open position without energy input.

The flexible display 38 can be any flexible display able to display graphical information, such as electronic paper, an E ink display, a polymer vision display, an electrowetting display, a polymer light-emitting diode (PolyLED) display, an organic light-emitting diode (OLED) display, a stratified liquid crystal (LC) display, or the like. The flexible display 38 is shown as transparent for clarity of illustration, although the flexible display 38 displays graphical information and can be opaque. The first frame 32 and second frame 34 typically include housing portions (not shown) that are mateable to enclose the flexible display 38 and spreader mechanism 50 when the flexible display device 30 is in the closed position. In this example, the flexible display 38 rolls about an axle (not shown) of the second frame 34 for storage in the closed position. The axle is spring loaded to maintain tension on the flexible display 38 and to bias the spreader mechanism 50 toward the closed position from the open position. In another embodiment, the flexible display 38 is folded when the flexible display device 30 is in the closed position. The flexible display device 30 can be any electronic device displaying information, such as a global positioning system (GPS) receiver, a mobile telephone, a personal digital assistant (PDA), an eBook reader, a photo viewer, an MP3 player, a news alert viewer, a streaming video viewer, a video teleconferencing device, a remote control, an entertainment program guide, or the like.

Figure 2:
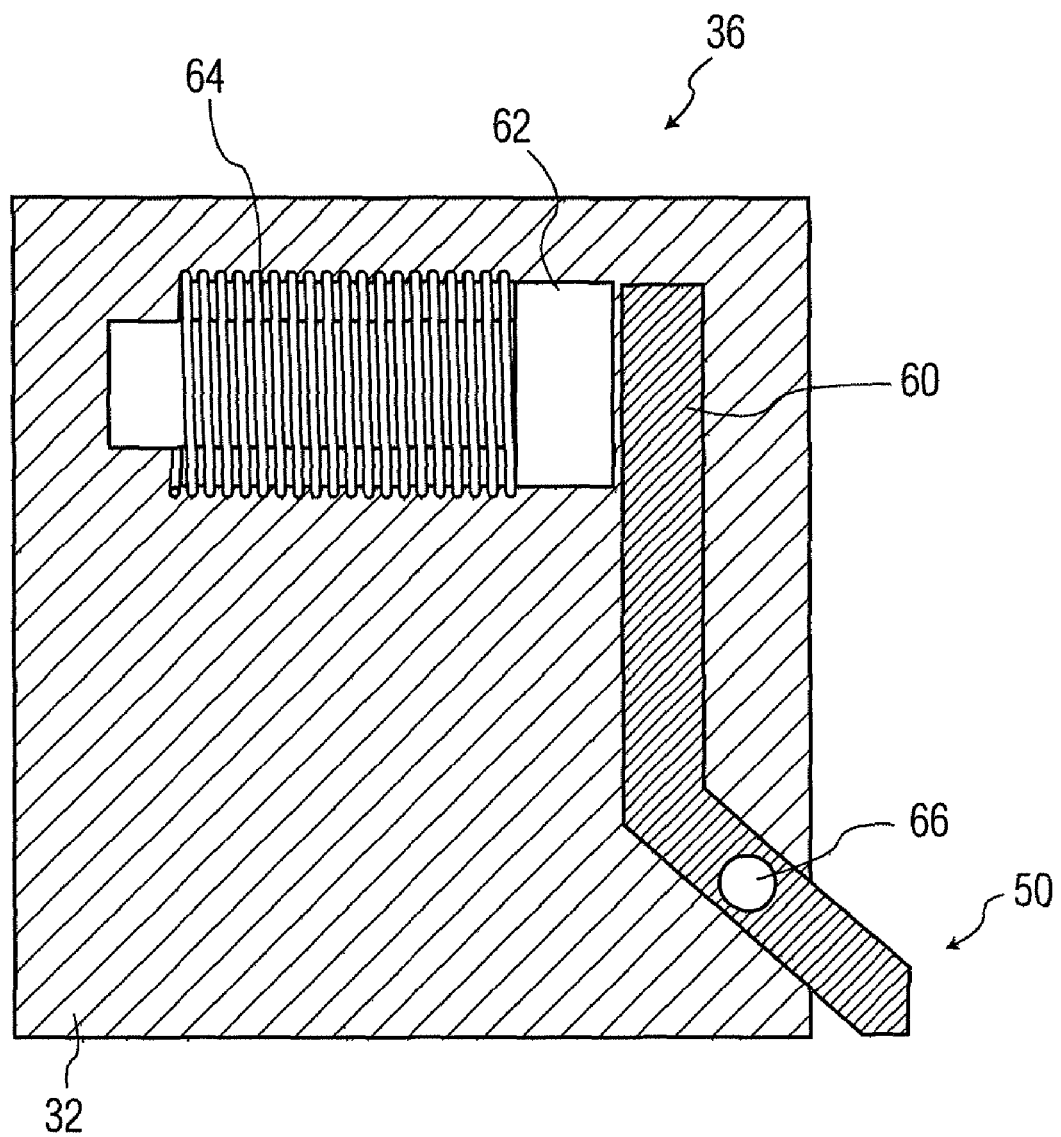
FIG. 2 is a detail view of a latch assembly for the flexible display device of FIG. 1 made in accordance with the present invention.

FIG. 2, in which like elements share like reference numbers with FIG. 1, is a detail view of a latch assembly for the flexible display device of FIG. 1 made in accordance with the present invention. In this example, the latch assembly 36 uses a magnet 62 to maintain the spreader mechanism 50 in an open position and a coil 64 to release the spreader mechanism 50.

The latch assembly 36 includes a spreader lever 60, a magnet 62, and a coil 64. The spreader lever 60 is part of the spreader mechanism 50 and is pivotably attached to the first frame 32 by a pin 66. The spreader lever 60 is formed of or includes a ferromagnetic material, such as iron, nickel, cobalt, ferromagnetic alloys, and the like, so that the magnet 62 holds the spreader lever 60 against the magnet 62 when the spreader mechanism 50 is in the open position. The magnet 62 is typically a permanent magnet, although those skilled in the art will appreciate that the magnet 62 can be an electromagnet. The coil 64 is disposed on or near the magnet 62, so that the coil magnetic field from the energized coil 64 offsets the magnet magnetic field of the magnet 62 to the extent required to release the spreader lever 60 from the magnet 62. In one embodiment, the coil 64 is wound about the axial length of the magnet 62. Those skilled in the art will appreciate that the magnet 62 and coil 64 can be in any arrangement desired as long as the coil magnetic field can sufficiently offset the magnet magnetic field. The coil 64 is operably connected to an acceleration processor (not shown) that provides a close signal to energize the coil 64 and release the spreader lever 60 of the spreader mechanism 50. The close signal is generated when an acceleration signal from an acceleration sensor exceeds a predetermined minimum acceleration limit when the flexible display device is dropped.

In operation, the magnet 62 engages the spreader lever 60 when the spreader mechanism 50 is moved to the open position to display the flexible display for use. The magnet 62 holds the spreader mechanism 50 in the open position against the tension on the flexible display which tries to close the flexible display device. When the flexible display device is dropped, the coil 64 receives a close signal from the acceleration processor to energize the coil 64. The magnetic field of the coil 64 negates the magnetic field of the magnet 62, which releases the spreader lever 60 holding the spreader mechanism 50 in the open position. The tension on the flexible display moves the spreader mechanism 50 to the closed position so that the spreader mechanism 50 and flexible display are enclosed and protected in the housing of the flexible display device. Typically, the flexible display device is in the closed position before it strikes the floor. In one embodiment, the latch assembly 36 includes a mechanism so that the release of the latch assembly 36 can be performed manually to close the flexible display device. For example, the spreader lever 60 can protrude from the housing of the flexible display device and the user can manually release the spreader lever 60 from the magnet 62 by pushing the spreader lever 60 away from the magnet 62. In another embodiment, the latch assembly 36 can be activated by the user to close the flexible display device. For example, the coil 64 can be energized by pushing a button or other switch to provide power to the coil 64 as the close signal.

Figure 3:
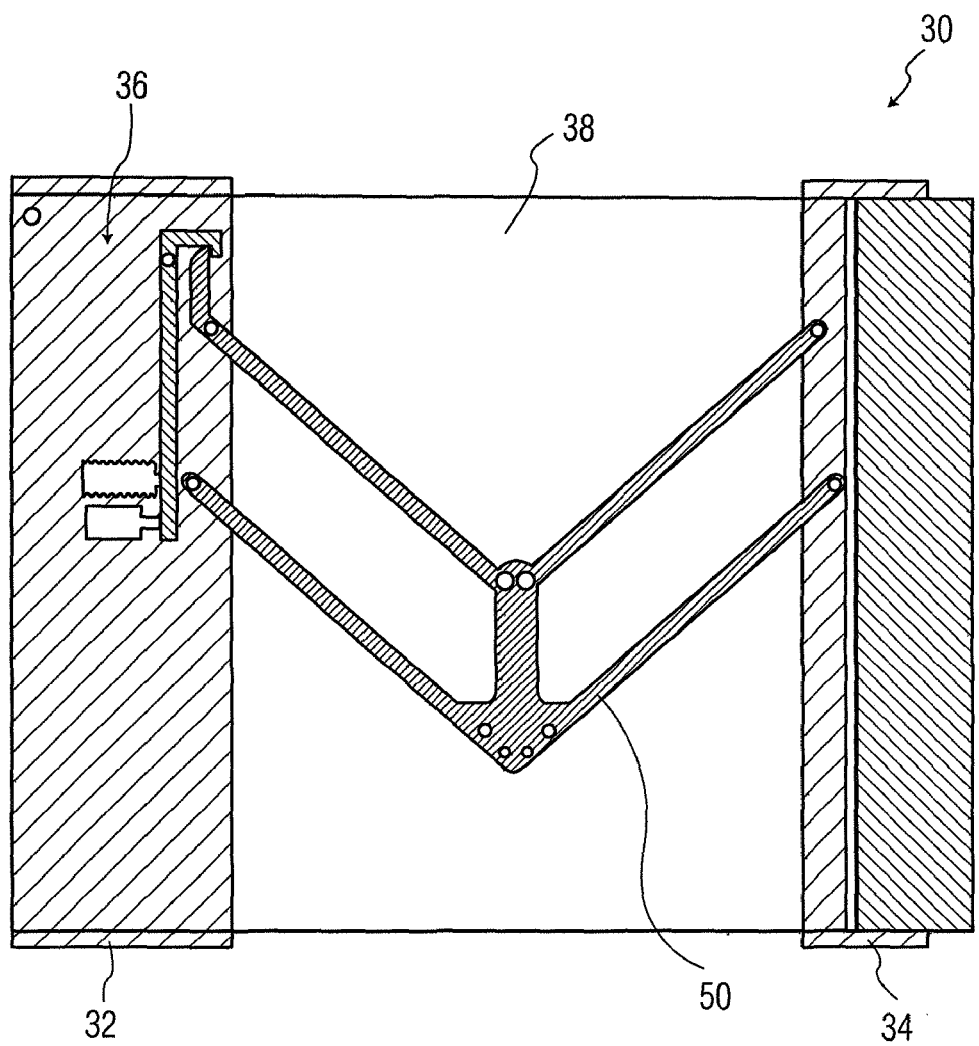
FIG. 3 is a front view in the extended configuration of another flexible display device made in accordance with the present invention.

FIG. 3, in which like elements share like reference numbers with FIG. 1, is a front view in the extended configuration of another flexible display device made in accordance with the present invention. In this example, the flexible display device uses a solenoid in the latch assembly to mechanically release the spreader mechanism from the open position when the flexible display device is dropped. The flexible display device 30 includes a first frame 32, a second frame 34, a flexible display 38, and a spreader mechanism 50. The spreader mechanism 50 is operably connected to the flexible display 38 through the first frame 32 and second frame 34 to maintain the flexible display 38 in a planar configuration when the flexible display device 30 is in the open position as illustrated. The spreader mechanism 50 has a latch assembly 36 that maintains the spreader mechanism 50 in an open position.

Figure 4:
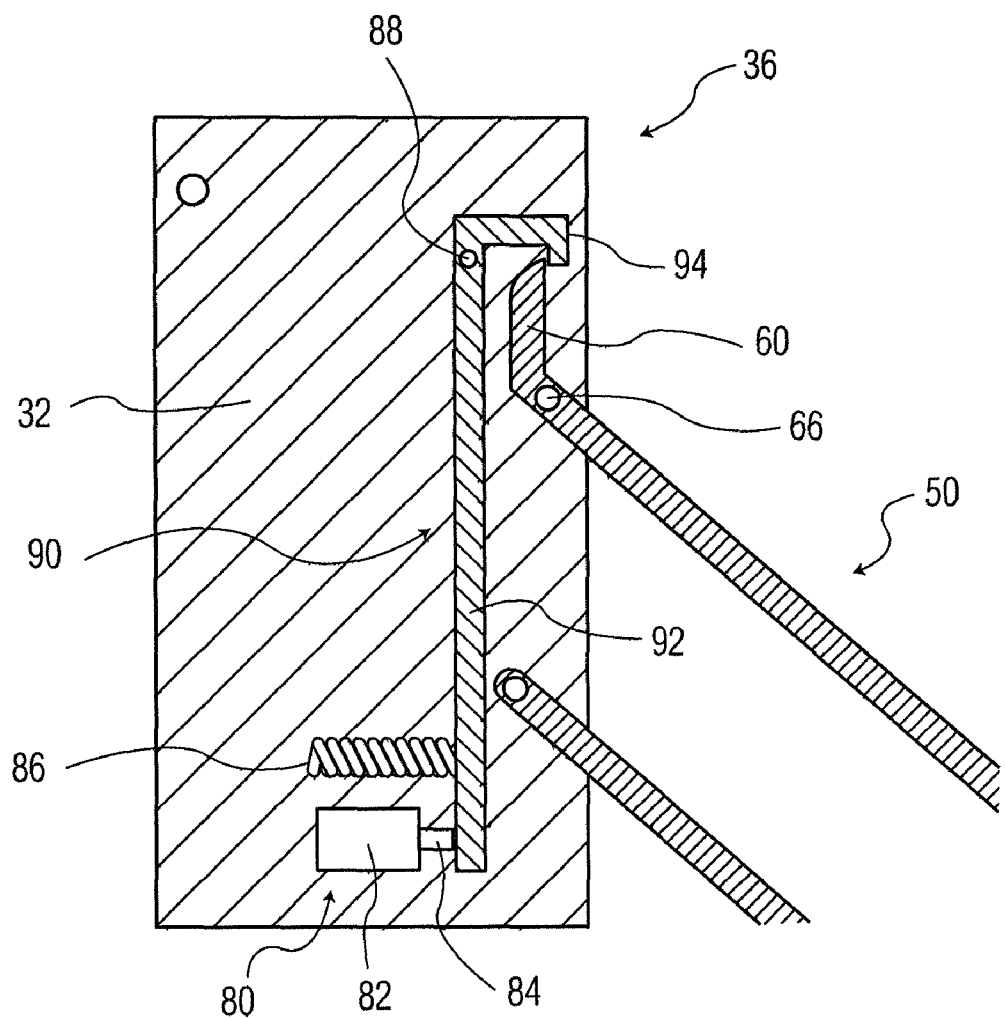
FIG. 4 is a detail view of a latch assembly for the flexible display device of FIG. 3 made in accordance with the present invention.

FIG. 4 is a detail view of a latch assembly for the flexible display device of FIG. 3 made in accordance with the present invention. In this example, the latch assembly 36 uses a transmission lever 90 and spring 86 to maintain the spreader mechanism 50 in an open position and a solenoid 80 to release the spreader mechanism 50. The latch assembly 36 is shown in the latched position, i.e., the spreader lever 60 is latched with the transmission lever 90 to hold the spreader mechanism 50 in the open position.

The latch assembly 36 includes a spreader lever 60, a transmission lever 90, a spring 86, and a solenoid 80. The spreader lever 60 is part of the spreader mechanism 50 and is pivotably attached to the first frame 32 by a pin 66. The transmission lever 90 includes an arm 92 and a catch 94. The transmission lever 90 is pivotably attached to the first frame 32 by transmission pin 88. The spreader lever 60 engages the catch 94 of the transmission lever 90 in a latched position when the spreader mechanism 50 is placed in the open position. The spring 86 biases the arm 92 of the transmission lever 90 to lock the spreader lever 60 in place. The solenoid 80 having a solenoid coil 82 and a solenoid plunger 84 is disposed so that the motion of the solenoid plunger 84 releases the spreader lever 60 from the transmission lever 90. The transmission lever 90 amplifies the motion of the solenoid plunger 84. The solenoid coil 82 is operably connected to an acceleration processor (not shown) that provides a close signal to energize the solenoid coil 82 and release the spreader lever 60 of the spreader mechanism 50. The close signal is generated when an acceleration signal from an acceleration sensor exceeds a predetermined acceleration limit when the flexible display device is dropped.

In operation, the catch 94 of the transmission lever 90 engages the spreader lever 60 when the spreader mechanism 50 is moved to the open position to display the flexible display for use. The surface of the spreader lever 60 engaging the catch 94 can be radiused to allow the spreader lever 60 to move easily into the latched position where the catch 94 locks. The catch 94 holds the spreader mechanism 50 in the open position against the tension on the flexible display which tries to close the flexible display device. When the flexible display device is dropped, the solenoid coil 82 receives a close signal from the acceleration processor to energize the solenoid coil 82. The force from the solenoid plunger 84 overcomes the force from the spring 86, which releases the spreader lever 60 from the catch 94. The tension on the flexible display moves the spreader mechanism 50 to the closed position so that the spreader mechanism 50 and flexible display are enclosed and protected in the housing of the flexible display device. Typically, the flexible display device is in the closed position before it strikes the floor. In one embodiment, the latch assembly 36 includes a mechanism so that the release of the latch assembly 36 can be performed manually to close the flexible display device. For example, the arm 92 or an extension of the arm 92 can protrude from the housing of the flexible display device and the user can manually release the spreader lever 60 from the catch 94 by pushing the arm 92. In another embodiment, the latch assembly 36 can be activated by the user to close the flexible display device. For example, the solenoid coil 82 can be energized by pushing a button or other switch to provide power to the solenoid coil 82.

Figure 5:
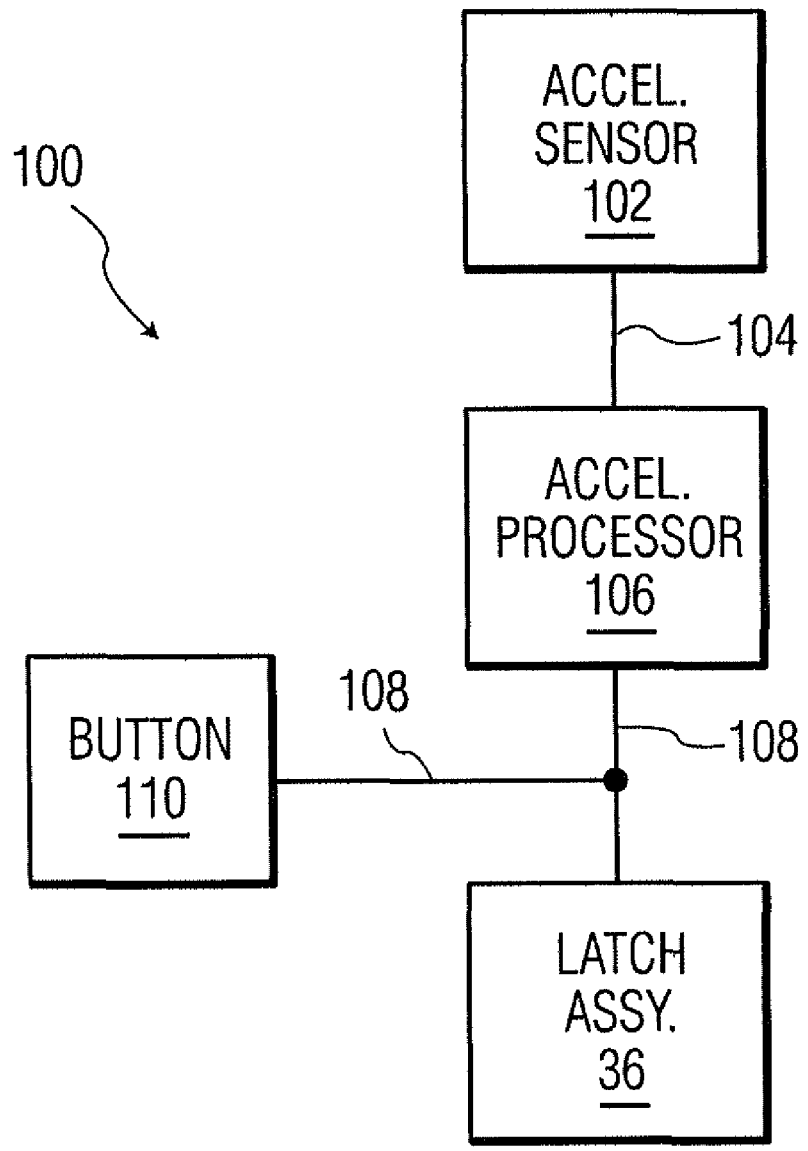
FIG. 5 is a block diagram of a control circuit for a flexible display device made in accordance with the present invention.

FIG. 5 is a block diagram of a control circuit for a flexible display device made in accordance with the present invention. The control circuit 100 uses an acceleration sensor 102 to detect the acceleration of the flexible display device. The acceleration sensor 102 generates an acceleration signal 104, which is provided to an acceleration processor 106. The acceleration processor 106 is responsive to the acceleration signal 104 and generates a close signal 108 when the acceleration signal 104 exceeds a predetermined minimum acceleration limit, indicating that the flexible display device has been dropped. The close signal 108 is provided to the latch assembly 36, which is responsive to the close signal to release the spreader mechanism from the open position, allowing the tension on the flexible display to close the flexible display device. In one embodiment, the control circuit 100 can include an optional button 110 or other switch as a user actuated device to generate the close signal 108 to the latch assembly 36 to release the flexible display device from the open position.

The acceleration processor 106 can be any processor operable to provide a close signal responsive to an acceleration signal, such as a data processor, a microprocessor, an analog circuit, or the like. The acceleration processor 106 can be a portion of the main processor used in the flexible display device to carry out device functions, such as graphics display, GPS information processing, or other functions, or can be an independent processor dedicated to providing the close signal in response to the acceleration signal. Exemplary acceleration sensors include the Kionix KXP74-1050 from Kionix, Inc., of Ithaca, N.Y.; the Freescale MMA7260Q from Freescale Semiconductor, Inc., of Austin, Tex.; and the Memsic MXA2500G&M from Memsic, Inc., of North Andover, Mass.

Figure 6:
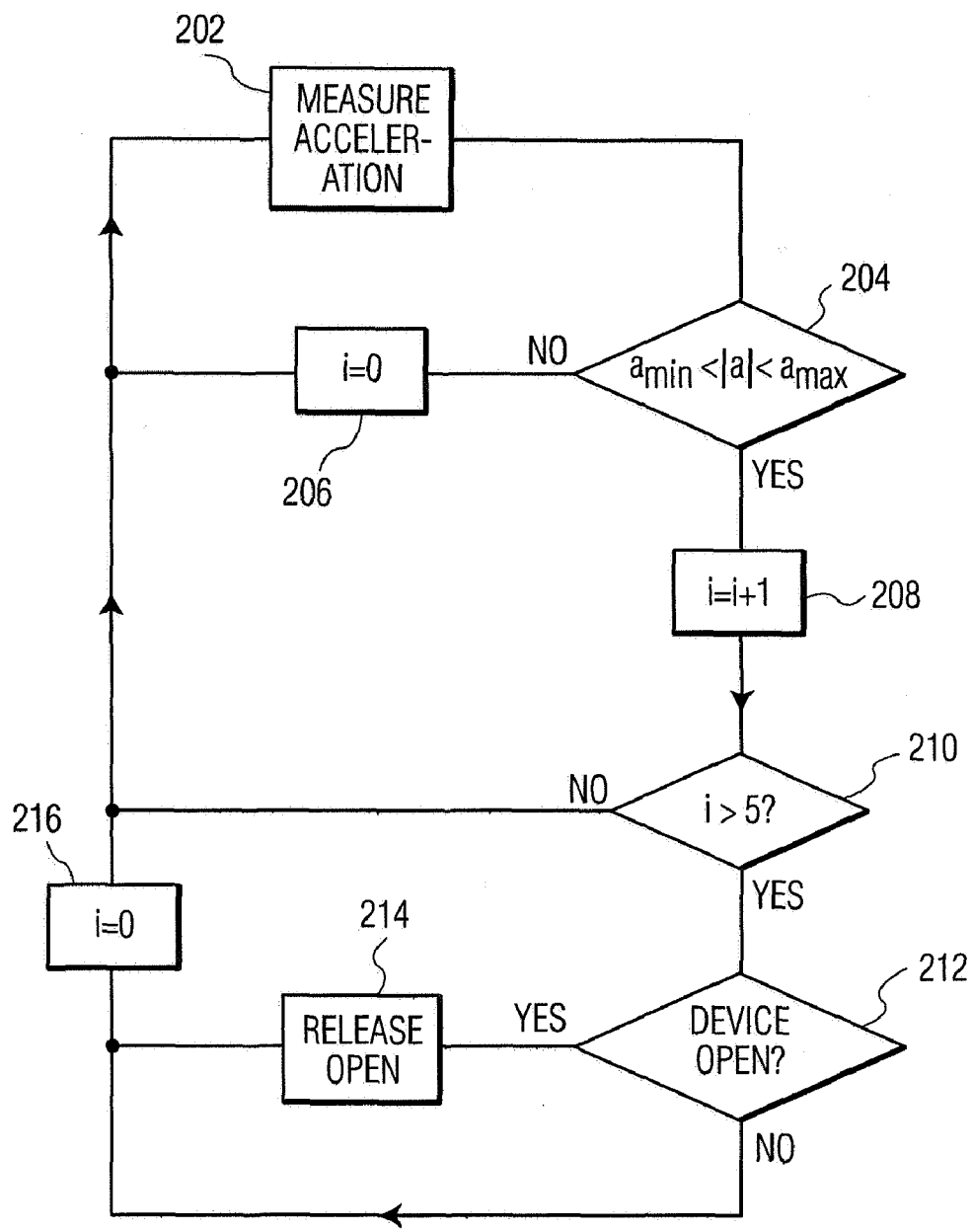
FIG. 6 is a flow chart of a control method for a flexible display device made in accordance with the present invention.

FIG. 6 is a flow chart of a control method for a flexible display device made in accordance with the present invention. The control method is implemented by the acceleration processor using the acceleration signal from the acceleration sensor and generates the close signal.

In this example, the control method 200 runs in a loop when the flexible display device is not in the closed position. The acceleration sensor measures the acceleration of the flexible display device 202, such as measuring the acceleration of the center of mass of the flexible display device. It is determined whether the absolute value of the acceleration is greater than a predetermined minimum acceleration limit $a_{min}$ 204. In one embodiment, the predetermined minimum acceleration limit $a_{min}$ is a large fraction of gravitational acceleration, such as about 9.5 m/sec$^2$ or the like. In one embodiment, it is also determined whether the absolute value of the acceleration is less than a predetermined maximum acceleration limit $a_{max}$ 204. In one embodiment, the predetermined maximum acceleration limit $a_{max}$ is slightly larger than gravitational acceleration, such as about 10.0 m/sec$^2$ or the like. When the absolute value of the acceleration is not greater than a predetermined minimum acceleration limit, the counter i is reset to the initial value 206 and the control method 200 continues with measuring the acceleration of the flexible display device 202. When the absolute value of the acceleration is greater than a predetermined minimum acceleration limit, the counter i is incremented 208.

It is determined whether the counter i is greater than a predetermined number of intervals, such as five intervals 210. The predetermined number of intervals can be one or more. When the counter i is less than or equal to a predetermined number of intervals, the control method 200 continues with measuring the acceleration of the flexible display device 202. When the counter i is greater than a predetermined number of intervals, a close signal can be generated. In one embodiment, it is optionally determined whether the flexible display device is in the open position 212. When the flexible display device is in the open position, the flexible display device is released from the open position 214, such as releasing a latch assembly in response to a close signal. When the flexible display device is not in the open position, the counter i is reset to the initial value 216 and the control method 200 continues with measuring the acceleration of the flexible display device 202. Those skilled in the art will appreciate that the determination whether the flexible display device is in the open position 212 can be omitted and the flexible display device released from the open position when the counter i is greater than the predetermined number of intervals, regardless of the position of the flexible display device.

The loop time can be selected to assure that the flexible display device has been dropped before closing the flexible display device, while allowing time to close the flexible display device before the flexible display device hits the floor. The loop time acts as a clock and the predetermined number of intervals acts as a timer setpoint for determining whether the flexible display device has been dropped. In one embodiment, the loop time is about 20 msec. A drop of 1.25 meters takes about 500 msec, on earth. With a loop time of 20 msec. and a predetermined number of intervals of five intervals, the close signal is generated in 100 msec, after the flexible display device is dropped. This leaves 500 less 100 msec., or 400 msec., for the flexible display device to close before it hits the floor. Those skilled in the art will appreciate that loop time and predetermined number of intervals can be selected for the particular application desired. The predetermined number of intervals in which the value is between $a_{min}$ and $a_{max}$ can be set to a value greater than one interval to make sure the measured value is really a drop and not a coincidence. Typically, the display is released when the acceleration is between $a_{min}$ and $a_{max}$ for a certain amount of time.

The use of a predetermined maximum acceleration limit $a_{max}$ in addition to the predetermined minimum acceleration limit $a_{min}$ establishes an acceleration range in which the absolute value of the acceleration is considered unusual and a close signal should be generated when the acceleration is within the band for a predetermined time or number of intervals. The use of a predetermined maximum acceleration limit $a_{max}$ prevents generation of the close signal and closing the flexible display device when the flexible display device is jarred or bumped, but not dropped. The range between $a_{min}$ and $a_{max}$ can be selected to allow for the acceleration sensor accuracy, i.e., to be sure the range is larger than the inaccuracy of the acceleration sensor. The predetermined maximum acceleration limit $a_{max}$ can act by inhibiting the release of the flexible display device from the open position when the acceleration exceeds the predetermined maximum acceleration limit $a_{max}$.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein. The specification and drawings are accordingly to be regarded in an illustrative manner and are not intended to limit the scope of the appended claims.

In interpreting the appended claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item or hardware or software implemented structure or function;
 e) any of the disclosed elements may be comprised of hardware portions (e.g., including discrete and integrated electronic circuitry), software portions (e.g., computer programming), and any combination thereof;
 f) hardware portions may be comprised of one or both of analog and digital portions;
 g) any of the disclosed devices or portions thereof may be combined together or separated into further portions unless specifically stated otherwise; and
 h) no specific sequence of acts is intended to be required unless specifically indicated.

The invention claimed is:

1. A flexible display device comprising:
 a flexible display;
 a spreader mechanism operably connected to the flexible display, the spreader mechanism having a latch assembly to maintain the spreader mechanism in an open position;
 an acceleration sensor generating an acceleration signal; and
 an acceleration processor responsive to the acceleration signal and generating a close signal when the acceleration signal exceeds a predetermined acceleration limit;
 wherein the latch assembly is responsive to the close signal to release the spreader mechanism from the open position, wherein the acceleration processor is configured to generate the close signal when the device is dropped.

2. The device of claim 1 wherein the flexible display is under tension to urge the spreader mechanism toward a closed position.

3. The device of claim 1 wherein the latch assembly is passive.

4. The device of claim 1 wherein the latch assembly comprises: a spreader lever operably connected to the spreader mechanism; a magnet having a magnetic field, the magnet being disposed to attract the spreader lever and latch the spreader mechanism in the open position; a coil operable to receive the close signal, the coil generating a coil magnetic field in response to the close signal; wherein the coil magnetic field offsets the magnet magnetic field to release the spreader lever from the magnet when the coil receives the close signal.

5. The device of claim 4 wherein the spreader lever is manually operable to release the spreader mechanism from the open position.

6. The device of claim 1 wherein the latch assembly comprises:
 a spreader lever operably connected to the spreader mechanism;
 a transmission lever operable to engage the spreader lever in a latched position;
 a solenoid having a solenoid coil and a solenoid plunger, the solenoid coil being operable to move the solenoid plunger in response to the close signal;
 wherein the solenoid plunger moves the transmission lever from the latched position to release the spreader lever from the transmission lever when the solenoid coil receives the close signal.

7. The device of claim 6 further comprising a spring biasing the transmission lever toward the latched position.

8. The device of claim 6 wherein the spreader lever is manually operable to release the spreader mechanism from the open position.

9. The device of claim 1 further comprising a switch operably connected to provide the close signal to the latch assembly in response to pushing the switch.

10. A method for auto-closing a flexible display device having an open position and a closed position comprising:
 measuring acceleration of the flexible display device;
 determining when the flexible display device is dropped by determining whether the acceleration exceeds a predetermined minimum acceleration limit; and
 releasing the flexible display device from the open position when the flexible display device is dropped.

11. The method of claim 10 further comprising: determining whether the acceleration exceeds a predetermined maximum acceleration limit; and inhibiting the releasing the flexible display device from the open position when the acceleration exceeds the predetermined maximum acceleration limit.

12. The method of claim 10 wherein the measuring acceleration comprises measuring acceleration at intervals and the determining comprises determining whether the acceleration exceeds a predetermined minimum acceleration limit for a predetermined number of the intervals.

13. The method of claim 10 wherein the measuring acceleration comprises measuring acceleration of the flexible display device when the flexible display device is not in the closed position.

14. The method of claim 10 wherein the releasing comprises determining whether the flexible display device is in the open position and releasing the flexible display device front the open position when the acceleration exceeds the predetermined minimum acceleration limit and the flexible display device is in the open position.

15. The method of claim 10 further comprising manually releasing the flexible display device from the open position.

16. The method of claim 10 further comprising pushing a button to manually generate a close signal to release the flexible display device from the open position.

17. A flexible display device system comprising:
 a flexible display device having means for spreading a flexible display, the spreading means having an open position and a closed position;
 means for measuring acceleration of the flexible display device;
 means for determining when the flexible display device is dropped by determining whether the acceleration exceeds a predetermined minimum acceleration limit; and
 means for releasing the spreading means from the open position when the flexible display device is dropped.

18. The system of claim 17 further comprising: means for determining whether the acceleration exceeds a predetermined maximum acceleration limit; and means for inhibiting the releasing the spreading means from the open position when the acceleration exceeds the predetermined maximum acceleration limit.

19. The system of claim 17 wherein the means for measuring acceleration comprises means for measuring acceleration at intervals and the means for determining comprises means for determining whether the acceleration exceeds a predetermined minimum acceleration limit for a predetermined number of the intervals.

20. The system of claim 17 wherein the means for measuring acceleration comprises means for measuring acceleration of the flexible display device when the spreading means is not in the closed position.

21. The system of claim 17 wherein the means for releasing comprises means for determining whether the spreading means is in the open position and means for releasing the spreading means from the open position when the acceleration exceeds the predetermined minimum acceleration limit and the spreading means is in the open position.

22. The system of claim 17 wherein the means for releasing further comprises means for manually releasing the spreading means from the open position.

23. The system of claim 17 further comprising user actuated means for generating the close signal to release the flexible display device from the open position.

* * * * *